United States Patent
Laurent et al.

[11] Patent Number: 5,853,526
[45] Date of Patent: Dec. 29, 1998

[54] TIRE ASSEMBLING AND VULCANIZATION

[75] Inventors: Daniel Laurent, Meylan; Hervé Mousty, Orcet, both of France

[73] Assignee: Sedepro, Paris, France

[21] Appl. No.: 785,422

[22] Filed: Jan. 23, 1997

Related U.S. Application Data

[63] Continuation of Ser. No. 449,419, May 24, 1995, abandoned.

[30] Foreign Application Priority Data

May 27, 1994 [FR] France .................................. 94 06656

[51] Int. Cl.⁶ .................................................. B29D 30/12
[52] U.S. Cl. ........................ 156/396; 156/416; 156/421.2; 425/36; 425/45; 425/58
[58] Field of Search ................................ 156/416, 421.2, 156/421.6, 396; 425/42–45, 52, 53, 36, 58

[56] References Cited

U.S. PATENT DOCUMENTS

| | | | |
|---|---|---|---|
| 1,405,427 | 2/1922 | Ofensend . | |
| 1,667,127 | 4/1928 | Mead | 425/43 |
| 1,923,705 | 8/1933 | Campbell et al. | 156/416 |
| 2,824,336 | 2/1958 | Weigold et al. | 156/416 |
| 2,855,629 | 10/1958 | Barefoot | 425/43 |
| 2,910,109 | 10/1959 | Fröhlich et al. . | |
| 3,107,192 | 10/1963 | McNenney | 156/416 |
| 3,154,455 | 10/1964 | Nebout | 156/416 |
| 3,329,748 | 7/1967 | Hugger | 425/42 |
| 3,380,872 | 4/1968 | Pouilloux | 156/416 |
| 3,726,742 | 4/1973 | Harris . | |
| 3,909,337 | 9/1975 | Yabe | 156/416 |
| 3,990,930 | 11/1976 | Schmit . | |
| 4,203,713 | 5/1980 | Napolitano | 425/43 |
| 4,239,565 | 12/1980 | Henley et al. | 156/416 |
| 4,474,633 | 10/1984 | Watts . | |
| 4,877,469 | 10/1989 | Szyms et al. | 156/416 |

FOREIGN PATENT DOCUMENTS

| | | |
|---|---|---|
| A0096648 | 12/1983 | European Pat. Off. . |
| 0578106 | 1/1994 | European Pat. Off. . |
| 0580991 | 2/1994 | European Pat. Off. . |
| A1934465 | 1/1971 | Germany . |
| A2734587 | 2/1979 | Germany . |

*Primary Examiner*—Geoffrey L. Knable
*Attorney, Agent, or Firm*—Baker & Botts, L.L.P.

[57] ABSTRACT

A module (1) used for the manufacture of tires, comprising an inflatable flexible bladder (10) provided with two beads (11) which is used for the assembling and vulcanization of the tire on the bladder, each bead being anchored on a plate (30, 31). The module (1) has at least one rigid wall mounted on a plate (30, 31) which is adjacent said flexible bladder (10) when the latter is inflated and can be retracted so as to be able to separate the tire from said module (1) after vulcanization and can be spread out radially so as to constitute a reference surface for the assembling of the tire.

4 Claims, 4 Drawing Sheets

TIRE ASSEMBLING AND VULCANIZATION

This application is a continuation of application Ser. No. 08/449,419, filed on May 24, 1995, now abandoned.

BACKGROUND OF THE INVENTION

The present invention relates to the manufacture of tires. More particularly, it relates to techniques for the manufacture of tires on a support the shape of which is very close or even identical to the final manufactured shape of the tire.

U.S. Pat. No. 4,895,692 describes a tire mold having a rigid core which determines the inner shape of the tire; it also describes a process of assembling the tire with the use of such a mold. Such a mold can be considered "rigid", since this mold imposes upon the tire a molding space of a given volume. This volume is bounded on the outside by the shells of the mold and by the group of sectors molding the tread, and on the inside by the rigid core. The use of this mold leads to a vulcanization stage with quasi-imposed volume. It is also known that most of the molds currently used at the present time are molds having only the two shells which assure the molding of the outside of the sidewalls and a ring of sectors which assure the molding of the outside of the tread. The use of these molds upon vulcanization leads, in order to assure the molding, to the spreading out within the raw tire of a flexible bladder, so that it can be considered that the vulcanization takes place in this case with imposed pressure and not with imposed volume.

SUMMARY OF THE INVENTION

The object of the present invention is to manufacture a tire on a support which is as close as possible to its final manufactured shape, in accordance with the technique described in U.S. Pat. No. 4,895,692, while carrying out a vulcanization step which is related rather to the process which has been referred to above as vulcanization with imposed pressure.

One object pursued by the invention is to create a process for the manufacture of a tire which avoids the tire blank undergoing, during its assembly, transfers consisting in displacing it from one drum to another or one support to another. All such transfers and manipulations of the blank are in fact the source of numerous inaccuracies in assembly and the source of defects in the uniformity of the tire produced.

For this purpose, the invention proposes a process for the manufacture of a tire which comprises an assembly phase forming a raw blank and a vulcanization phase, in which use is made of an inflatable flexible bladder capable of retaining by adherence the raw rubber constituting the inner skin of the tire during the assembly phase and capable of separating from the tire after vulcanization, which comprises the following stages:

said bladder is inflated to a given assembly pressure so as to form a reference support for the assembling, said support having a toroidal shape, thereupon a raw blank is formed, starting by the depositing of the rubber constituting the inner skin of the tire by the winding of a ribbon, and then progressively depositing all the desired components, in the required order, onto said bladder, the blank is then vulcanized, and finally said bladder is deflated and withdrawn from the inside of the tire.

In order to effect the vulcanizing of the blank on the bladder itself, there can advantageously be closed around the blank a mold for the molding of the outer surface of the sidewalls and the tread, and the pressure of said bladder then adjusted to a molding pressure which is sufficient to assure the molding of the tire and, at the end of the vulcanization, the bladder is deflated in order to permit the separation of the skin and said bladder and to permit the discharge of the vulcanized tire.

This consists in manufacturing a tire completely on an inflatable bladder and then vulcanizing it on the same bladder, without any transfer of the blank with respect to the bladder. The bladder used is capable of maintaining the raw rubber constituting the inner skin of the tire upon the depositing during the assembly phase. It is understood by this that the rubber ribbon which is deposited on the bladder adheres to the latter sufficiently in order to remain in the place where it has been deposited. For the depositing of this ribbon, one can use different techniques, such as the depositing of a preshaped ribbon, or else the direct extrusion of an amount of rubber which is fully controlled as a function of the exact place where it is deposited on the bladder.

It is furthermore necessary that the bladder used can separate from the tire after use. In order to satisfy these conditions, it is made of a material which makes it possible to obtain a good raw adhesive (that is to say, a material which the raw rubber adheres to sufficiently for the requirements of the depositing), while assuring the separation of the vulcanized tire. For example, the bladder is made of rubber having a surface covering which satisfies the conditions indicated. Aside form the characteristic mentioned above, or in combination with it, one can also use an elastomer which has a certain level of incompatibility with the products used in the tire, and more particularly with the products of which the inner skin of the tire is made.

By "manufacture of a tire", there is understood both complete and partial manufacture, that is to say, possibly, the manufacture of a unit comprising the crown reinforcements and the tread alone, or the manufacture of a tire without such a unit. Whatever the object manufactured, the reference support receives all the raw materials, which are in general deposited by winding on the support, as well as all the following materials for producing a complete assembly, contrary to other known arrangements in which the vulcanization bladder or else a receiving drum such as a second-stage drum receives a complex product formed of a semi-finished product obtained by the assembling of several elementary components.

By "support of toroidal shape", there is understood a support the shape of the outer apparent surface of which is very far from a cylindrical shape, in order to approach a shape resembling the shape of the inner surface of the tire. This shape is therefore of a very different nature from the shape of the first-stage assembly drums known in the prior art which have a quasi-cylindrical surface, bordered on either side by a groove or a shoulder in order to define the position of the bead wires. This shape of revolution may have a radial section which is approximately a circular arc or else resembling a trapezoid.

In order to be able to manufacture a tire on a form which corresponds substantially to the final manufactured and vulcanized shape of the tire, a reinforced bladder is preferably employed. It is thus possible to obtain a flexible form which, once inflated to a pressure of the same order of magnitude as the inflation pressure of passenger car tires, behaves substantially as a rigid form. This permits the use of tire assembly tools which are known for the manufacture of a tire on a rigid core, such as those described in U.S. Pat. Nos. 4,801,344, and 4,804,436 or else 4,963,207, by way of illustration but not of limitation.

The invention also proposes a tire manufacturing module which comprises an inflatable flexible bladder which can be retracted when it is deflated, said module comprising means making it possible to anchor said bladder and making it possible to offer a hold for the displacement of the module and making it possible with said bladder to define an inflatable enclosure forming at least partially a support of toroidal shape in inflated state.

This module permits the assembling of a tire and its transfer then to a vulcanization station. The module preferably has two connecting sockets making it possible to circulate a fluid providing the heat necessary for the vulcanization. At the vulcanization station, the fluid used is, for instance, electricity, the module being for instance equipped with resistors capable of producing heat, or else a heat-exchange fluid which conducts heat to the inside of the module. As the case may be, said connecting sockets may be either electric inlets or connectors for gaseous or liquid fluid. Due to the sealing means between plates, it offers the possibility of providing an autonomous inflated support which can be transported in inflated state from station to station during the assembling of the tire, without it being necessary to connect it each time to a source providing a fluid under pressure.

In accordance with one interesting embodiment, the invention offers a module comprising a bladder provided with two beads, each bead being anchored on a plate, said module comprising at least one rigid wall mounted on a plate, adjacent to said flexible bladder when it is inflated, arranged on the outer side thereof and retractable in order to be able to separate the tire from said module after vulcanization and capable of being spread out radially in order to constitute a continuous surface serving as reference for the assembling of the tire.

The advantage of this arrangement is that it makes it possible more easily to effect the depositing of the rubber constituting the inner skin of the tire by the winding of a ribbon. One can, in fact, select for said wall a material onto which the first rubber windings adhere very easily, such as for instance a metal material. If the adjacent turns overlap slightly until covering the entire support, the adherence of the ribbons to each other is sufficient in order for the rubber deposited to be held in place on the support even if the rubber itself adheres less easily to the bladder.

Preferably, said wall is extended radially up to a radius beyond which the radial section of the inner surface of the tire manufactured with said modules does not form any point of inflection. In this case, another advantage of the rigid wall associated with a bladder is that it makes it possible to obtain a support on which a tire can be manufactured really without any shaping due to the fact that in this case the support can correspond precisely to the inner shape of the tire.

The invention also covers a tire vulcanization station comprising a mold for the molding of the outer surface of the sidewalls and tread of the tire, which is used with a module comprising an inflatable flexible bladder capable of imparting a molding pressure to the inner surface of a tire, said bladder comprising two beads, and said module having furthermore two plates each used for the anchoring of one of said beads, said module being mounted removably in the vulcanization station so that it can be extracted from it or introduced into it and supporting a raw tire, said vulcanization station comprising means for assuring a relative axial movement between said plates when said module is mounted in the vulcanization station.

All of the operations for the configuration of the module (movements of the plates, adjustment of the inflation pressure of the bladder, etc.) which are necessary for the complete manufacture of the tire can be carried out in this vulcanization station. It comprises the means for connecting the module to a source of fluid under pressure. The said pressure can first of all be adjusted to that just necessary in order to effect the assembling of the tire and then, when the module reaches the vulcanization station supporting a raw tire, it is possible to transmit to the module the pressure and the heat necessary for the vulcanization. Furthermore, it is also possible to impart to the module the movements facilitating the extraction of the bladder from the inside of the tire after the vulcanization of the tire. It is, in fact, advantageous to be able to move apart the plates which support the bladder so as to cause a folding of the bladder. By combining this folding with a sufficient vacuum within the bladder, the bladder can be separated from the inner surface of the tire and folded in such a manner that the vulcanized tire can easily be extracted.

Finally, the invention proposes a tire manufacturing machine comprising an assembly unit and an associated vulcanization station. More precisely, the manufacturing machine for a tire in accordance with the invention comprises an inflatable flexible bladder capable of holding the raw rubber constituting the inner skin of the tire during the assembly phase and capable of separating from the tire after the vulcanization of the latter, and it comprises

- at least one assembly station having the means necessary for forming a raw blank,
- at least one vulcanization station having the means necessary to assure the curing of the blank, and
- means for the transfer of said module between stations.

DESCRIPTION OF THE DRAWINGS

A non-limitative embodiment of the invention is described below with reference to the accompanying drawings. This makes it possible clearly to understand the invention and all of its advantages.

DESCRIPTION OF PREFERRED EMBODIMENTS

Figure 1:
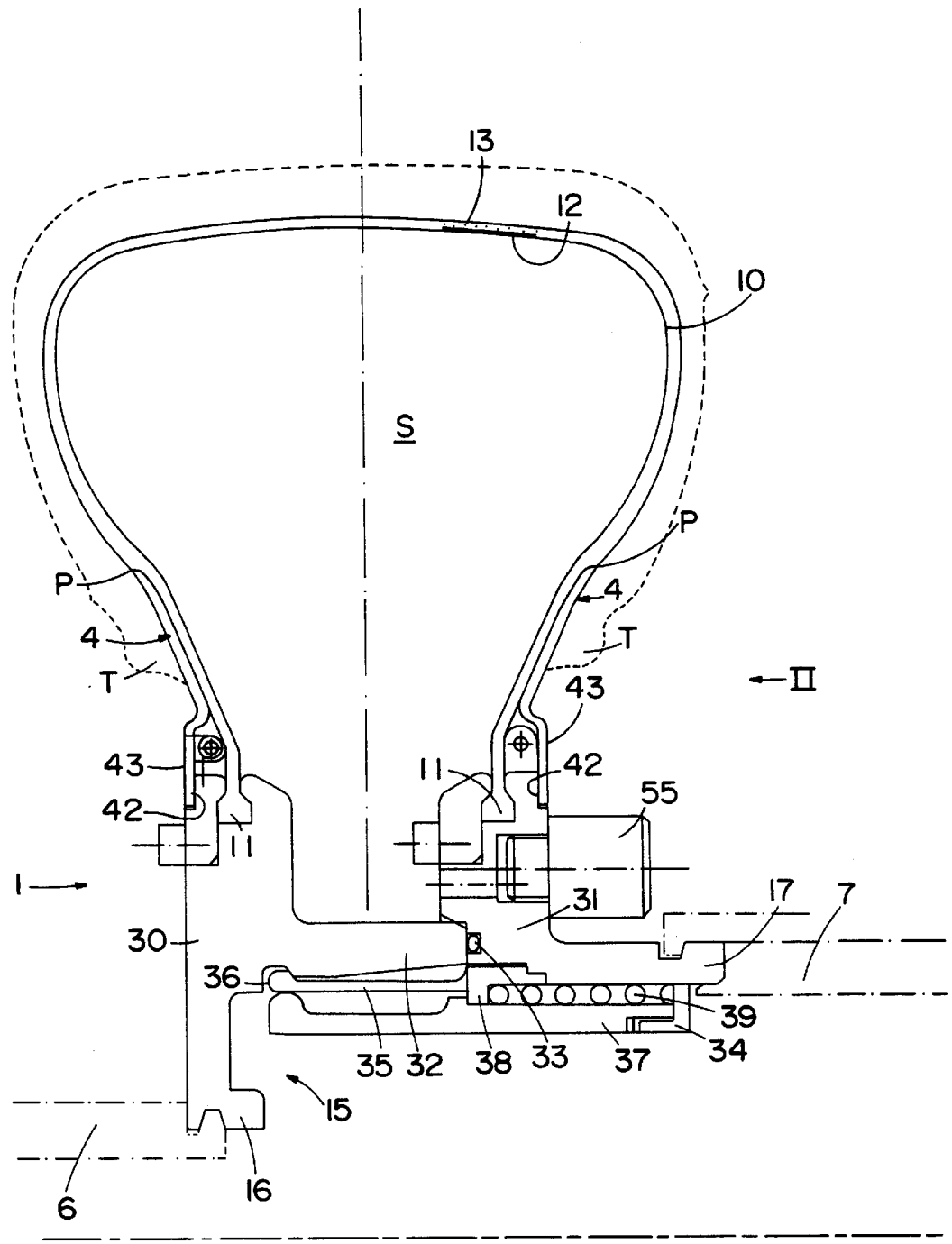
FIG. 1 shows a tire manufacturing module in accordance with the invention as configured for the assembling phase of a tire.

FIG. 1 shows a flexible bladder 10 having two beads 11. Each of the beads is mounted on a plate 30, 31. The bladder 10 has reinforcement wires 12 oriented 90° (in accordance with the customary convention for angles used in the tire industry), extending from one bead 11 to the other. The bladder 10 also has wires 13 which are oriented 0°. In order not to encumber the drawing, the arrangement of the wires 12 and 13 is indicated only locally. By the combination of these 90° wires and 0° wires, it is possible perfectly to control the profile in the convex portion of the outer surface of the bladder when it is inflated (that is to say, the contour of the radial section as shown above the points P in FIG. 1).

The plate 31 has a toroidal sealing joint 33 mounted in a groove which is coaxial to said plate. The plate 30 has a shoulder 32 which comes against the sealing joint 33 when the two plates 30 and 31 are moved axially against each other. The plate 31 comprises a locking mechanism 34 which makes it possible to maintain the plates 30 and 31 connected. The locking mechanism 34 has several flexible blades 35 which are circumferentially distributed and the end of which can engage in a circumferential groove 36 provided on the plate 30. The blades 35 are held enclosed in the circumferential groove 36 by a nondeformable clip 37 which can slide axially and is held in locking position against a stop 38 under the action of a spring 39. In the assembled and locked position, the plates 30 and 31 form a rim 15 which, together with the bladder 10, constitutes an air-tight enclosure S capable of being inflated due to an automatically closing valve 55 arranged on the plate 31.

The module 1 formed in this manner is an independent unit which it is possible to arrange at several places depending on the manufacturing requirements of the tire. The plate 30 has an extension 16 which offers a grip by which the rim 15 can be grasped. In similar manner, the plate 31 has an extension 17 offering a bearing surface by which the rim 15 can be grasped.

In order to manufacture the bladder 10, one uses, for instance, a removable or destructible rigid core which determines the shape of its inner surface. On this rigid core, suitable rubber products are deposited, such as, for instance, the elastomer HNBR (hydrogenated acrylonitrile-butadiene rubber) or the elastomer ethylene acrylate rubber, or a fluorinated elastomer, and the reinforcement wires are deposited, all in suitable manner. Thereupon, the assembly is vulcanized, using for instance an outer mold in order to impart the desirable vulcanization pressure, or else using an autoclave.

The use of 90° wires and 0° wires, while it permits an excellent control of the profile, does not, however, make it possible to obtain an inversion of the curvature of the support, that is to say it does not make it possible to produce the concave portions of the outer surface of the manufacturing support of the tire. Stated differently, the inflection point P on the radial section of the bladder could not be obtained. In order to be able to come as close as possible to the final internal shape of a tire to be manufactured, there is preferably employed a rigid wall 4 which is arranged radially under the place P where the section of the tire to be manufactured comprises a point of inflection. The raw blank T of the tire to be manufactured is shown in dashed lines, which makes it possible to see how it is arranged with respect to the bladder 10 and with respect to the walls 4. In the event that such rigid walls 4 are used, the 0° wires can reinforce only the portion of the bladder 10 which is radially above the points of inflection P. In such case, it is possible to completely control the shape of the radial section of the outer surface of the support on which the tire is manufactured without having to have recourse to other artifices such as mechanical elements which are spread out within the bladder.

Figure 2:
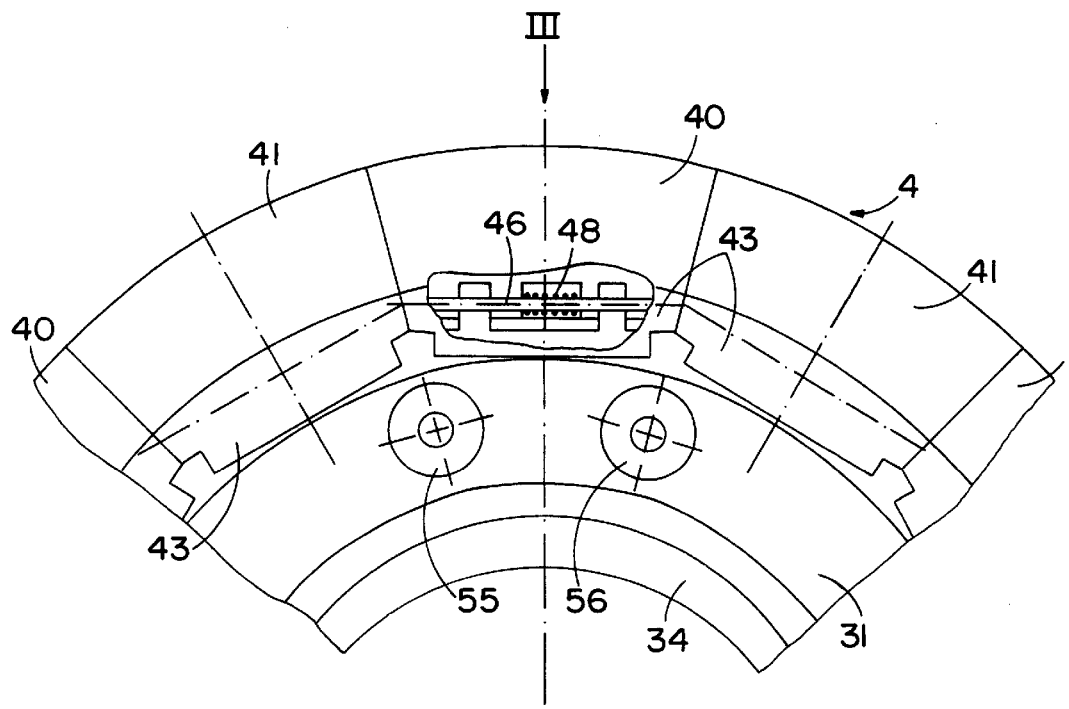
FIG. 2 is a partial side view, in the direction of the arrow II in FIG. 1, of the same manufacturing module.
Figure 3:
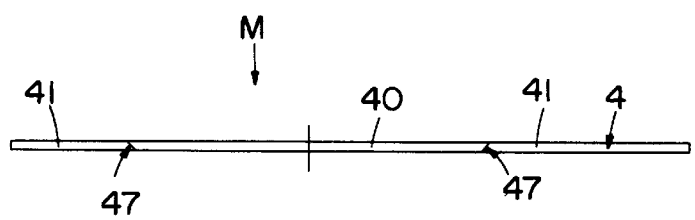
FIG. 3 illustrates a detail of the module, seen in the direction of the arrow III in FIG. 2.

The construction of the rigid wall 4 is shown, in particular, in FIGS. 2 and 3. It is necessary that this rigid wall 4 can be retracted when the tire is vulcanized in order to be able to release it from the module 1. For this purpose, the rigid wall 4 is formed by an assembly of/ petal-like members 40 and 41. In spread-out position (FIGS. 1 to 4), the members form a continuous surface, which can serve as reference for the assembling of the tire. The members are mounted on hinges 46 (see the broken-away portion of FIG. 2 in particular), and can be folded back by a rotation which brings them towards the center of the module 1 (FIG. 5). As this folding movement brings the radially upper part of these members towards the smaller radii, the place which is circumferentially available decreases. It is therefore necessary that the members overlap, which is obtained in the case described by the fact that the members 40 are folded back first and then only the members 41, so as to be arranged staggered, in retracted position, as is shown in FIG. 5. This movement will be explained in detail below.

We note first of all that the position in which the members 40, 41 define the rigid wall 4 is materialized by a stop 42 (see FIG. 1) against which the members 40, 41 rest via their extension 43. They are held against this stop 42 by the inflatable bladder 10.

The edges 47 of the members 40 and 41 are oriented on a bias and form support faces which complement each other, as shown in FIG. 3. Each wall, therefore, comprises an even number of members, distributed in two groups (one group identified by the reference numeral 40 and a second group identified by the reference numeral 41), the circumferentially adjacent members belonging to different groups. The bladder 10, not shown in FIGS. 2 and 3, is arranged on the side of the arrow M in FIG. 3, and in the rear with respect to FIG. 2. The arrow M symbolizes the force which the bladder 10 exerts under pressure against the members leaves 40 and 41, which force places them against the stop 42. When the bladder 10 is deflated or placed under vacuum, the force against the members 40 and 41 ceases. They are free to swing towards the position shown in FIG. 5. This swinging movement takes place in the direction opposite the arrow M. As a result of the bias configuration of the side edges 47, the swinging of the members 40 must always precede the swinging of the members 41, and the return against the stop 42 of the members 41 must always precede the return of the members 40. The staggered arrangement of the members 40 and 41 is thus always possible and no blocking can take place.

Springs 48 mounted on the members 40 and 41 develop a force which opposes the force developed by the bladder 10 when the latter is under pressure. The force developed by these springs 48 therefore tends continuously to fold the members 40 towards the retracted configuration shown in FIG. 5. The movement from the retracted position of the members to the outwardly extending position is controlled by the inflation of the bladder 10. The opposite passage is permitted by the deflating of the bladder 10. It is not necessary to provide a specific control for the movements of the members. The springs 48 are arranged at least on the side of the module 1 by which the vulcanized tire is discharged, for a reason which will be made clear in the following. However, nothing prevents equipping the two walls with identical springs.

Figure 4:
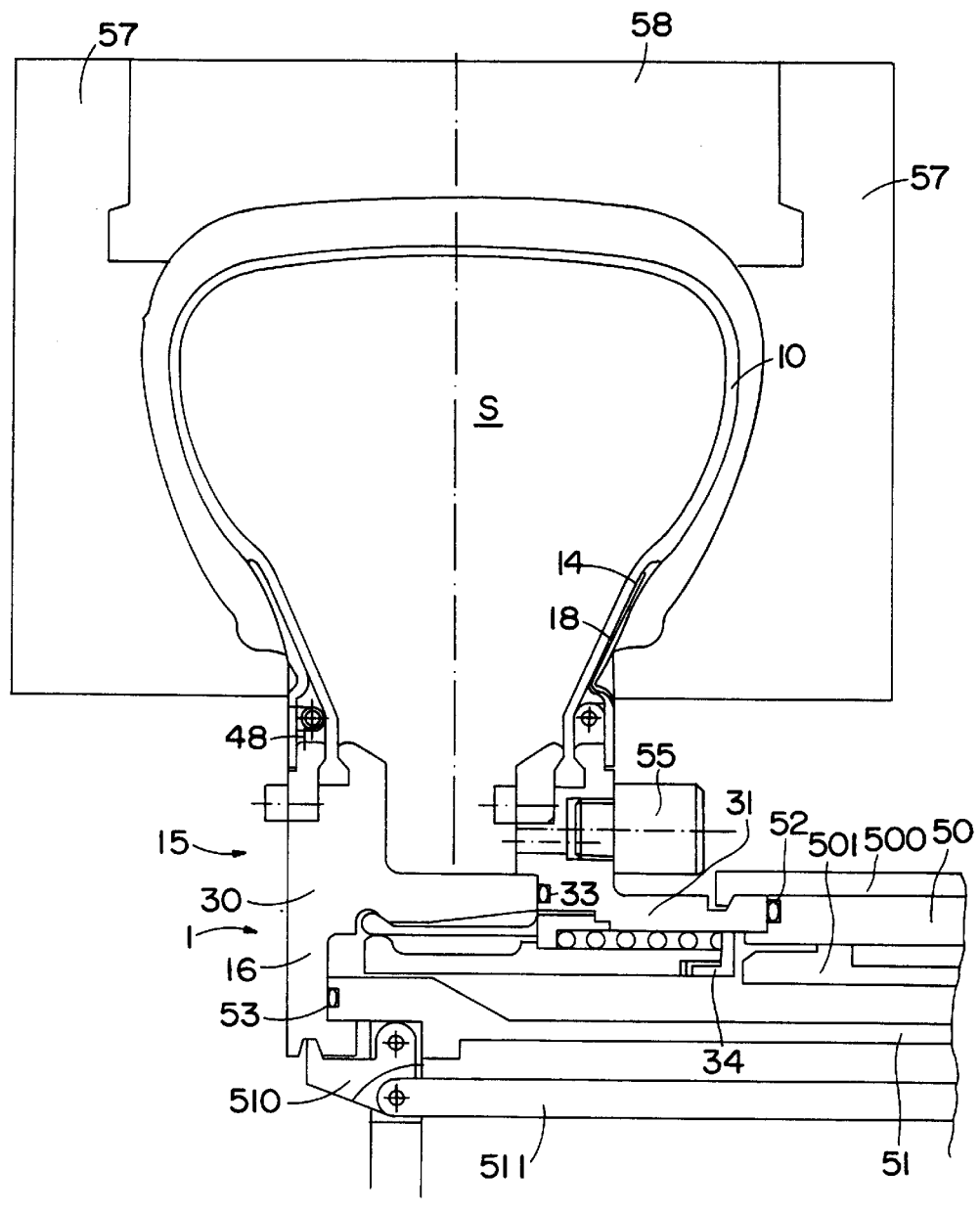
FIG. 4 shows the same module during the vulcanization phase.
Figure 5:
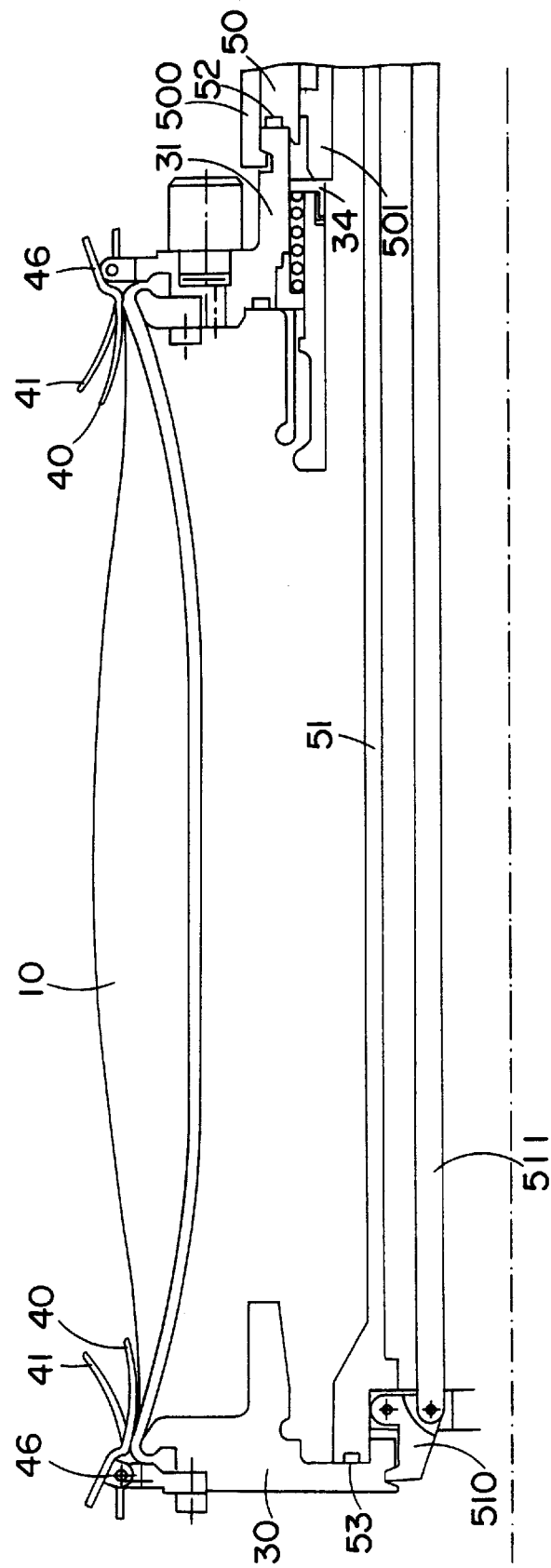
FIG. 5 shows the module of the invention in the position for the discharge of the tire.

FIGS. 4 and 5 show a module 1 mounted in a vulcanization station. There can be noted a mold for the molding of the outer surface of a tire, comprising two shells 57 and an assembly of sectors 58, as known per se. The vulcanization station comprises a gripper 50 on which the plate 31 can be mounted, which plate is immobilized by spurs 500. A sealing joint 52 mounted on the gripper 50 assures the tightness between the latter and the plate 31. A slide block 501 can push against the unlocking mechanism 34. A central piston-cylinder unit 51 is arranged at the level of the axis of the mold. It engages the left-hand plate 30. The connection is effected at the level of the extension 16 by rockers 510, controlled by rod 511. A sealing joint 53 assures the seal between the central cylinder-piston unit 51 and the plate 30. Sealing means (not shown) are provided between the gripper 50 and the central cylinder-piston unit 51. The assembly makes it possible to assure the tightness between plates 30 and 31 even when they are separated from each other.

The automatic closing valve 55, as well as another automatic closing valve 56 which is slightly shifted circumferentially (see FIG. 2), constitute the inlet and outlet for a heat-exchange fluid which is circulated within the bladder 10 at the vulcanization station. This heat-exchange fluid makes it possible to confer upon the bladder 10 the pressure necessary for the vulcanization, said pressure being in general greater than the molding pressure, and of course makes it possible to impart to the tire the heat necessary for the vulcanization. The conduits for the heat-exchange fluid and the circulation and heating means for this fluid have not been shown in order not needlessly to complicate the drawings.

The manufacture of a tire can be effected in the following manner. For example, one can use a tire manufacturing machine having an assembly station and a vulcanization station. In FIG. 1, there can be noted in dot-dash line, a bracket 6 which supports the rim 15 on the left-hand side, while on the right-hand side there can be noted a hub 7 on which the rim 15 is mounted.

The bracket 6 presents the module 1 to an assembly station comprising a hub such as 7. After mounting of the module 1 on the hub 7, the bracket releases the module 1 and moves away. The module 1 is thus installed at the assembly station and can be driven in rotation for the needs of the depositing of the component products of the tire. One starts by depositing onto the bladder 10 the butyl-base mix constituting the inner skin of the tire, whereupon all the necessary components are placed thereon, namely the reinforcement wires constituting the reinforcement of the tire and all the rubber mixes formulated in accordance with the place where they are deposited, and therefore in accordance with the function of these rubbers in the tire. All the necessary components are thus deposited at the required place on said bladder. The object of this invention, not being the architecture of the tire itself, does not require the details concerning the construction of any particular tire.

After assembly of the blank T, a bracket 6 can again grasp the module 1, which is then freed from the hub 7 and transported from the assembly station to the vulcanization station.

The use of the module 1 at the vulcanization station will now be described, referring in particular to FIGS. 4 and 5. A bracket 6 (see FIG. 1 for the bracket) brings the module 1 supporting a raw blank and presents it to the gripper 50. The spurs 500 close around the rim 15. The bracket 6 releases the rim 15 and is evacuated. The central cylinder-piston unit 51 approaches the plate 30 until engaging it. The rockers 510 grip the plate 30. The outer mold (shells 57 and sectors 58) can then be closed and all the operations for the curing of the tire can be carried out.

Thereupon, the tire is removed from the mold, which starts with the opening of the outer mold. In order to retract the bladder 10 and swing back the members 40 and 41, the action of the vacuum within the enclosure defined by the bladder 10 is combined with an axial movement of relative separation of the plates 30 and 31. The slide block 501 rests on the unlocking mechanism 34. From FIG. 5 it can be seen that the sliding of the central cylinder-piston unit 51 with respect to the gripper 50 makes it possible to move the plates apart. Due to the different sealing joints, this enclosure remains air-tight, so that it is possible to place it under vacuum in order to favor the folding and movement back of the bladder 10. One fold of said bladder 10 is visible in FIG. 5. Air can also be injected under pressure between the tire and the bladder 10 in order to facilitate the separation of the bladder. A favorable point for this injection is the back of the members in their radially upper part. An air channel 18 is provided within the thickness of a member, debouching on the surface of the member, for instance at 14 (see FIG. 4).

The tire can then be grasped by an unloading manipulator which grips it for instance by the tread. It can be evacuated by relative axial displacement between tire and module. As the moving apart of the plates 30, 31 precedes the discharging of the tire, it will be understood that the latter, which might have a tendency not to have followed the movement of the plate 30, must in all cases be capable of passing without difficulty over the assembly of members 40, 41 of the plate 30 present on the evacuation side (left side in FIG. 5). It is therefore from this side alone that it is indispensable to prevent their straightening up and opposing the discharge of the tire. This is the role of the springs 48 in this embodiment.

Thereupon, the central cylinder-piston unit 51 brings the plate 30 back into contact with the plate 31, whereupon the slide block 501 moves back in order to lock the plates and reconstitute the rim 15. In this way, the pressure inside the bladder can be reestablished to the level suitable for the assembling of the following tire.

The use of 0° and 90° wires of great stiffness (for instance of aramid) in order to reinforce a rubber bladder makes it possible nevertheless to retain for the latter an elastically deformable character under the effect of the internal pressure while excellently controlling its geometry at a given pressure. One can thus have an assembly support of very good geometrical precision, which makes this support similar to the rigid cores made of metal. At the same time, one has a vulcanization bladder which is capable of very easily accommodating small variations in the molding volume, due for instance to tolerances in the volumes of rubber constituting the raw blank; one has a bladder which is capable of accepting a slight additional shaping which, if it is provided, makes it possible to manufacture the raw blank very slightly below the final size of the tire, which can facilitate the closing of the sectors of the mold, in particular with certain tread patterns. Even if such a bladder, during the molding starting the curing phase, transmits to the tire a molding pressure which is only a fraction of its inflation pressure, it nevertheless is similar to the non-reinforced bladders used currently up to the present time. The molding cavity which it defines with the shells and the mold sectors can be termed semi-rigid.

The present invention makes it possible to combine the advantages of a manufacturing process without shaping with the advantages of a molding with a mold having fewer parts since without the inner core, and therefore without having to construct a mechanism for removing and again mounting such an inner core. All the elements described in the present specification have been given in order to provide a complete illustration of the invention, without, of course, it being necessary to use them simultaneously.

We claim:

1. A transportable tire manufacturing module for building a tire outside a mold and vulcanizing a tire within a mold, said module comprising an inflatable and deflatable flexible bladder having an outer tire building and molding surface, a bladder holder having relatively movable plates for anchoring the bladder along opposite edges of the bladder, the plates being separated to facilitate the removal of the vulcanized tire from the module, a central hub receiving means in one of the plates of the bladder holder for the rotation of the module during the deposit of products on the bladder, actuatable locking means between the relatively movable plates which are accessible and releasable through the hub receiving means for holding the plates together during the building and vulcanization of the tire and permitting them to be separated for the removal of the vulcanized tire from the module, the holder and bladder defining an inflatable enclosure which, in inflated condition, has a toroidal shape which serves as an inner reference surface for building and vulcanizing a tire, sealing means between the plates when the plates are held together, valve means in the holder for introducing and discharging an inflation medium into and from the enclosure for inflating and deflating the bladder, the enclosure being adapted to contain a heated fluid during vulcanization, at least one rigid wall mounted on one of the plates adjacent to the outside of the bladder in the region of the inner periphery of the bladder adjacent the anchored edges thereof, said rigid wall being retractable radially and inwardly over the bladder to permit removal of the tire from the module after vulcanization and moving outwardly when the bladder is inflated to provide a circumferentially continuous supporting surface for building the inner side wall of the bead portion of the tire during the assembling of the tire and a molding surface for the inner surface of the bead portion of the tire during vulcanization, and axially opposite coupling parts on the module adapted to be coupled with releasable grasping means and in which the said wall is formed by an assembly of members which arc articulated on said plate, around an axis perpendicular to a radial plane, forming a continuous inner convex surface engagable with the bladder and outer concave surface on which the inner surface of the bead portion of the tire is built and molded when the bladder is inflated, the members being arranged alternately one below the other in retracted position.

2. A module as set forth in claim 1 in which the movement of said members from the retracted position to the outward position is controlled by the inflation of said bladder and the reverse movement is permitted by the deflation of the bladder.

3. A module as set forth in claim 2 in which the assembly includes an even number of members distributed in two groups, the circumferentially adjacent members belonging to different groups, a movement of the members into retracted position orienting the members axially towards the center of the module.

4. A module as set forth in claim 1 including a stop for limiting the rotation of the members by the inflation of the bladder.

\* \* \* \* \*